United States Patent [19]

Fromme

[11] 3,914,818
[45] Oct. 28, 1975

[54] ROTARY DRY WIPING SYSTEM FOR VEHICLES

[76] Inventor: Richard H. Fromme, 71-467 Estellita, Rancho Mirage, Calif. 92270

[22] Filed: Jan. 6, 1975

[21] Appl. No.: 538,956

[52] U.S. Cl. .............................. 15/97 R; 15/DIG. 2
[51] Int. Cl.² ............................................ B60S 3/06
[58] Field of Search ................ 15/DIG. 2, 97 R, 302

[56] References Cited
UNITED STATES PATENTS

| | | | |
|---|---|---|---|
| 2,019,087 | 10/1935 | Morris et al. | 15/97 R |
| 3,504,394 | 4/1970 | Weigele et al. | 15/97 R |
| 3,510,898 | 5/1970 | Tatara et al. | 15/97 R |
| 3,683,441 | 8/1972 | Fromme | 15/97 R |

Primary Examiner—Edward L. Roberts
Attorney, Agent, or Firm—Christensen, O'Connor, Garrison & Havelka

[57] ABSTRACT

A mechanized rotary dry wiping system for automobile wash establishments comprising a multi-arm rotor assembly suspending wiping strips of chamois-like material which, as the rotor turns about a vertical axis, pass alternately over the automobile surfaces and into dewatering means comprising a pair of power-driven wringer rollers along an approach defined by novel guide means and preferably also including pressure nozzle means to rinse and moisten the strips.

11 Claims, 6 Drawing Figures

ROTARY DRY WIPING SYSTEM FOR VEHICLES

BACKGROUND OF THE INVENTION

This invention relates to mechanized car washing and drying systems, and more particularly to improvements in drying mechanisms that may be used effectively in such establishments.

In most automatic automobile washing facilities presently in commercial operation a conveyor mechanism advances the vehicle through a tunnel-like facility in which successively located devices actuated by the vehicle cause it first to be wetted down, then scrubbed with a detergent solution, thereafter rinsed and finally dried. Drying is most commonly accomplished by a series of blowers. The blowers supply relatively high pressure air to a group of nozzles located in an arch-like arrangement about the vehicle throughway. The air from the nozzles blows away most of the rinse water and accelerates evaporation of smaller droplets. However the system is inefficient for two main reasons. Firstly enough water is left on the vehicle to require the services of one or more workers stationed at the facility exit in order to perform a final dry wiping with a cloth so as to avoid leaving water stains or residue marks on the vehicle surfaces, especially around bumpers and windows. Secondly the blowers require large motors to operate them, typically at least 40 horsepower, thereby consuming great amounts of electrical energy. The magnitude of energy consumption is particularly evident when it is realized that the blowers operate in excess of a full minute for each automobile that passes through. Further, these blowers produce a high noise level which precludes individuals from working in close proximity to them for extended periods of time. This health-safety prohibition is specifically defined by the requirements of OSHA, Occupational Safety and Health Administration.

Other prior art automatic drying devices for removing rinse water from vehicles include those which mechanically sweep or draw absorbent materials across the wet surfaces such as in U.S. Pat. No. 3,683,441. That type of apparatus in its prior forms, however, has not always been as effective in water removable as desired and is subject to accumulations of dirt and grime in the absorbent materials requiring their frequent removal, laundering and replacement. Usually mechanical wiping systems of that type and air blowers are used in combination because neither acting alone is sufficiently effective.

A broad object of this invention is to provide an improved automobile drying mechanism, one which eliminates the need for a noisy energy-consuming blower, and performs its function by mechanical wiping with absorbent strips without the disadvantages mentioned above. Further the invention largely obviates the need for costly supplemental hand drying.

Operating on the principle of mechanical wiping with suspended absorbent material strips, the present invention has the further objective of removing rinse water effectively without also removing or damaging fragile projecting parts of the vehicle such as hood ornaments and windshield wiper blades.

A further specific objective hereof is to provide such a system which incorporates means for continual, automatic rinsing and dewatering of the absorbent wiping elements of the system as the system operates.

Capability of drying vehicles of varying widths, heights and configurations, low energy consumption, adaptability to existing car wash installations and related objectives of a practical nature are also satisfied by the invention.

These and other objects and advantages will be understood upon reference to the accompanying drawings and detailed specification relating to the presently preferred embodiment of the invention.

BRIEF DESCRIPTION OF INVENTION

As herein disclosed the improved automobile drying apparatus comprises a rotor assembly mounted above the path of advancement of an automobile moving through the vehicle wash establishment. The rotor assembly has arms thereon which support drying strips moved in horizontal circular orbit ranging beyond preferably both sides of the vehicle so as to wipe the sides of the vehicle and the upper surfaces thereof as the strips first encounter, then sweep across and then fall off the vehicle. On one side of the rotor assembly adjacent the path of the vehicle is stationed the watering mechanism comprising a pair of upright wringer rollers and associated guide means which lead the strips into the nip between the wringer rollers. One of the resiliently compressible rollers is mounted in a fail-safe automatic release mechanism comprising an over centering support arm which yields in response to the attempt of a large object, such as a person's hand, to pass between the rollers.

Preferably the drying strips supported by the rotor assembly comprise elongated polypropylene carpeting material strips to which, by means of "Velcro" elements, the actual wiping strips are attached. These wiping strips preferably comprise sheet strips of a chamois-like material which if maintained in a proper state of moistness is highly efficient in wiping dry the hard surfaces of a vehicle.

As a further feature, at the entrance to the nip between the wringer rollers which dewater the strips leaving the automobile, the apparatus comprises water spray nozzle means which rinses and moistens the chamois-like strips as they enter the nip between the wringer rollers. This assures a cleanliness of the strips and also a desired minimum level of moisture retention in the strips despite variations in atmospheric conditions and periods of business inactivity.

The preferred guide means leading the chamois-like strips into the wringer rollers comprises upright panels which are divergent outwardly of the entrance of the nip and are surfaced by nubby or carpet-like material which assures that the chamois-like strips will not cling or adhere to the guide elements attempting to enter the roller nip.

Synchronized, or at least approximately speed-related drive means turning the rotor assembly and the wringer rollers assure that the surface speeds of the rollers approximate the speed of travel of the strips moving orbitally in the rotor assembly so the chamois-like strips will not become detached.

These and other aspects of the invention will become more evident from the description which follows.

DETAILED DESCRIPTION

Figure 1:
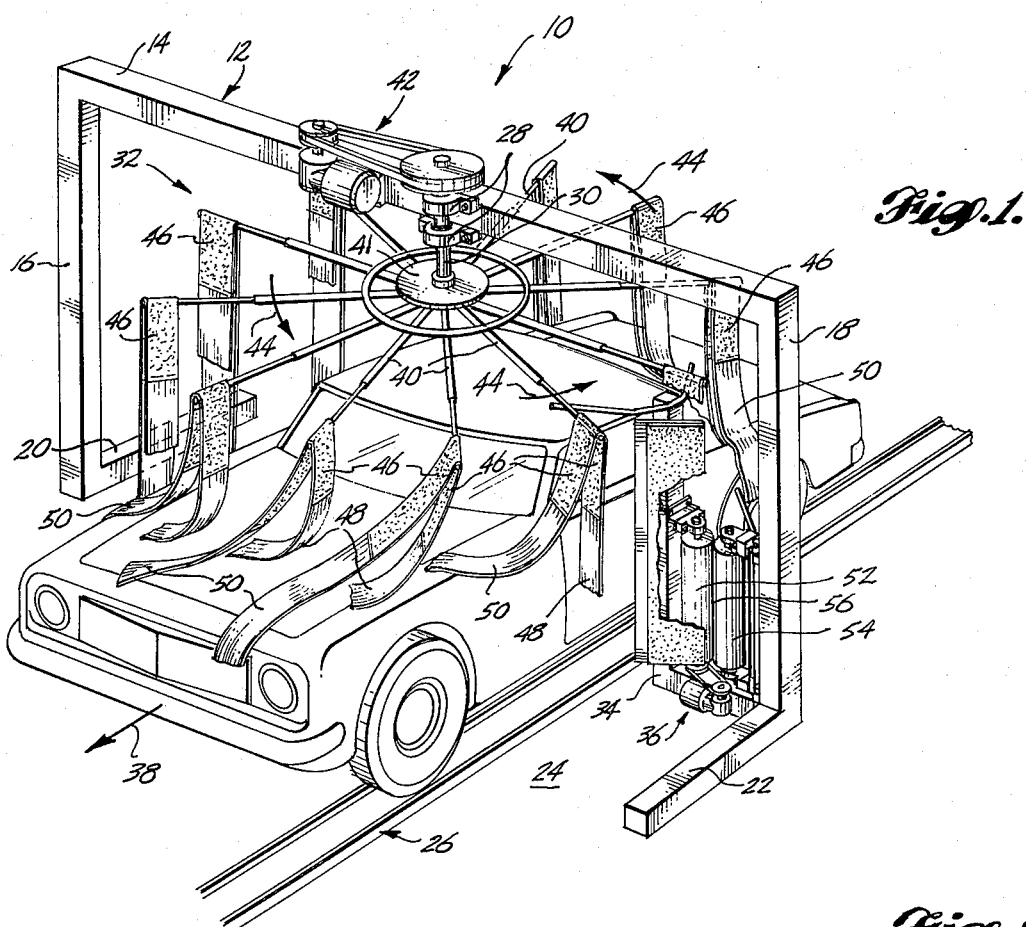
FIG. 1 is an isometric view of the system of the present invention in its presently preferred form.
Figure 2:
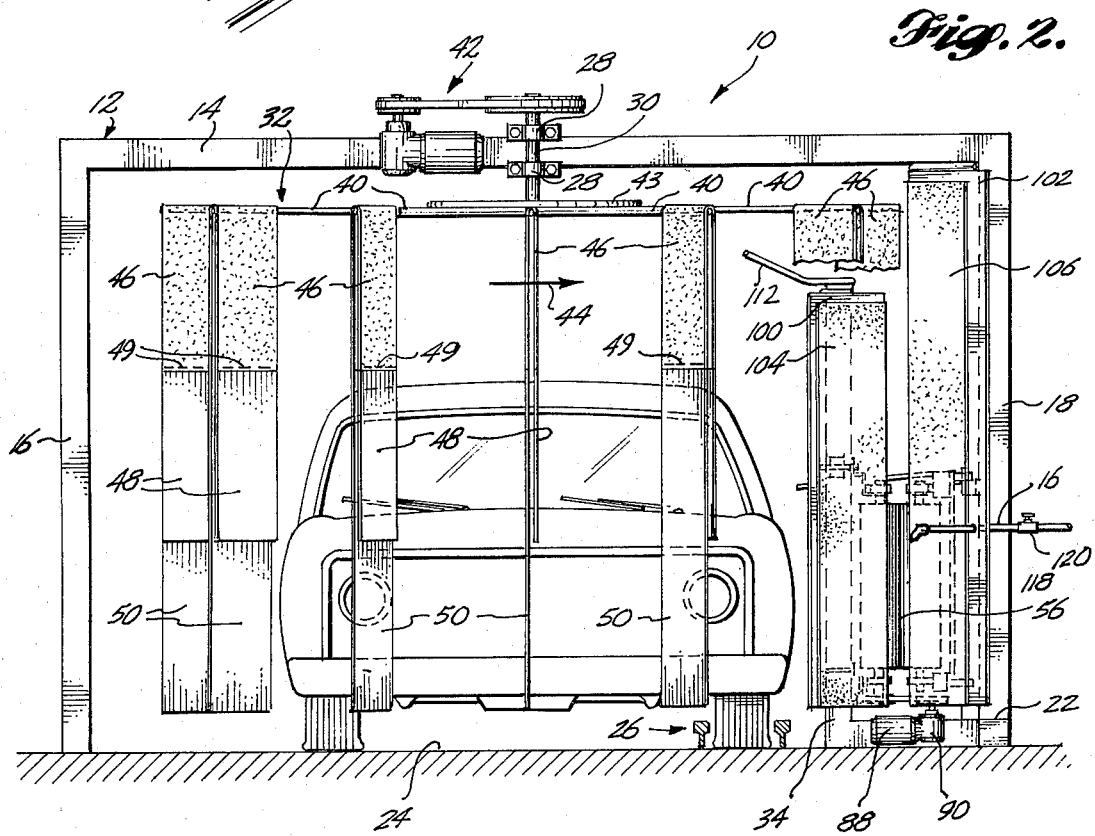
FIG. 2 is a front elevation view of the system shown in FIG. 1.
Figure 3:
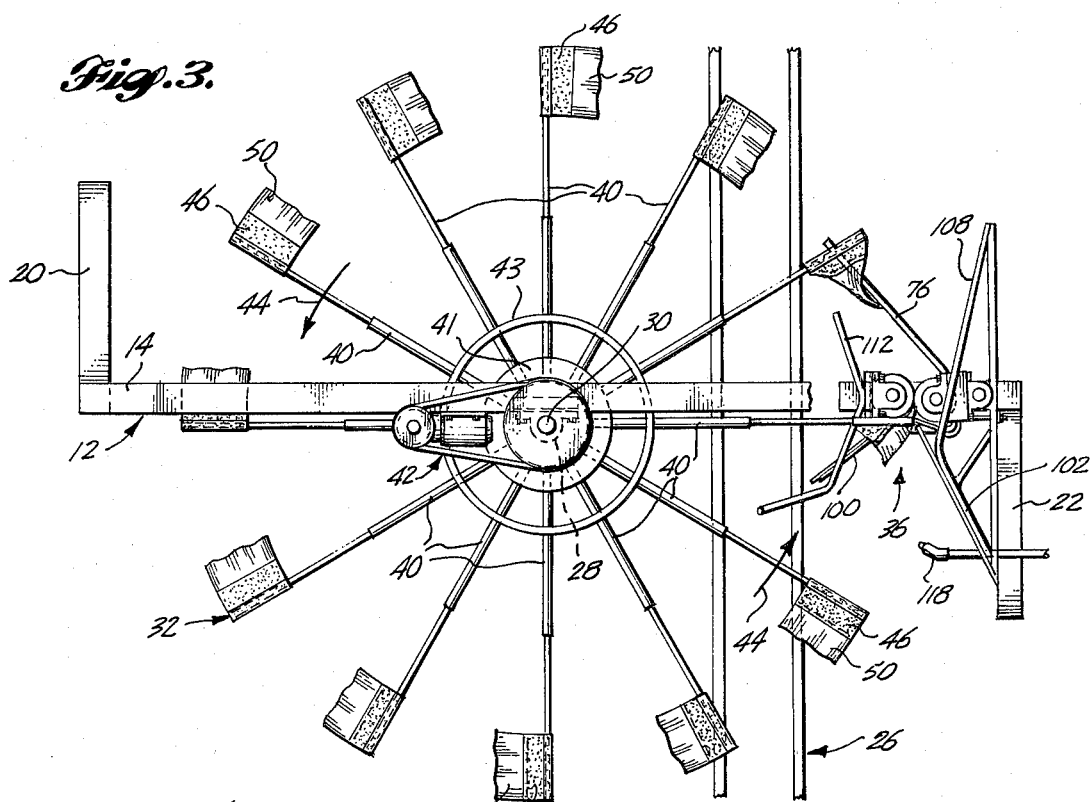
FIG. 3 is a plan view of the system shown in FIG. 1.

Referring to FIGS. 1, 2 and 3, the rotary dry wiping system 10 comprises a structural frame assembly 12 over arching the automobile conveyor 26. The frame comprises an elevated horizontal beam 14, supported at its ends on vertical posts 16 and 18 mounted in turn on stabilizing feet 20 and 22 respectively, which rest on the floor 24 adjacent opposite sides of the automobile path of advancement 38 in the machine. Intermediate the ends of horizontal beam 14 a multi-arm rotary spider assembly 32 is mounted in depending position on rotary vertical spindle 30 carried in supports 28. An L-shaped beam portion 34 attached to the lower extremity of one end post 18 and residing in the plane of the over-head horizontal beam 14 cooperates with the end post to provide mounting for the elements of the wringer assembly 36. If desired, a similar wringer assembly may also be provided at the opposite end of the apparatus, i.e., such that the wiper strips on the spindle may be wrung out (after rinsing) every 180 degrees of spider rotation.

The rotary dry wiping assembly 32 is generally similar to the rotary mopping device described in U.S. Pat. No. 3,683,441; however, alteration of the device of that patent and its subsequent interassociation with the wringer assembly as described herein, yields a system capable of accomplishing an entirely different end function; that function being the effective drying of vehicle surfaces as opposed to a mopping and scrubbing of those surfaces to loosen dirt particles as intended by the device in the referenced patent.

Spindle 30 has a circular plate 41 on its lower end which carries a plurality of radial arms 40, twelve in this case, of equal length and distributed at equal angles to each other about the vertical rotational axis of the spindle. A reinforcing ring 43 encircling plate 41 is welded to the arms intermediate their ends. The spindle is driven by any suitable means 42 such as a geared electric motor unit drivingly connected to the spindle through the illustrated belt and pulley arrangement. Preferably the drive unit 42 is speed adjustable such that wiper spider rotation may be "tuned" with the speed with which conveyor 26 conveys the vehicles through the facility in order to achieve best results as hereinafter described. In any case rotation of the wiper spider assembly is preferably in the direction indicated by the arrows 44 when a single rinse and wring unit 36 is used, i.e., only at one side of the system such that the wiper strips move from the advancing forward end of the car to such a unit first. The rotational speed at which the wiper spider assembly is driven is somewhat below the rate which would cause the suspended wiping strips to swing appreciably outwardly (i.e., more than a few degrees) by centrifugal force. While a "rotor" that turns on a spindle is illustrated it will be appreciated that a track-guided assembly for supporting the drying strips may also be employed and that the track need not form a circle but could assume the shape of an ellipse or other configuration.

Each arm in the spindle has suspended from its outer extremity a wiping means preferably comprising an elongated approximately 12-inch-wide strip of polypropylene carpeting material 46 draped intermediate its ends over the arm and two correspondingly 12-inch-wide strips 48 and 50 of natural or artificial chamois material attached to the hanging ends of the carpet strip. The carpeting strips are attached by rivets or other appropriate means to the respective arms such that the carpet strip ends hang to about the same elevation above the floor 24, preferably at or slightly above the height of an average passenger vehicle, as seen in FIG. 2. The lower extremities of each hanging carpet strip have attached along their lower edges on the forward face, i.e., forward relative to the direction of rotation as indicated by arrows 44, a strip of Velcro tape 49. Correspondingly, each chamois strip 48 and 50 has a strip of complemental Velcro tape attached along its upper end so as to provide a means to readily attach and remove the chamois strips.

During operation of the rotor, flexible stiffness and weight of the heavy support carpeting strips hanging from the spider arms tend to stabilize the positioning of the attached chamois strips relative to the vehicle and so act upon the chamois strips as they are drawn across the vehicle surfaces as to maximize the effectiveness of the resultant wiping action. The heavier carpeting material tends to dampen centrifugal force and trailing deflection effects produced on the chamois during operation. It should also be noted that the chamois strips 48 and 50 suspended from the respective ends of each carpeting strip are preferably of distinctly different lengths. The lagging or rearward chamois strips 50 preferably hang to within about 6 inches of the floor surface 24. The shorter forward strips 48 may be varied in length, however, they normally hang to a level approximately midway between the top and bottom of an average automobile body, i.e., to the lower edges of the side windows. The Velcro attachment strips interconnecting the carpeting and chamois permit the chamois to easily pull away from the carpeting without tearing the strips or damaging vehicle parts catching or snagging the chamois.

Figure 4:
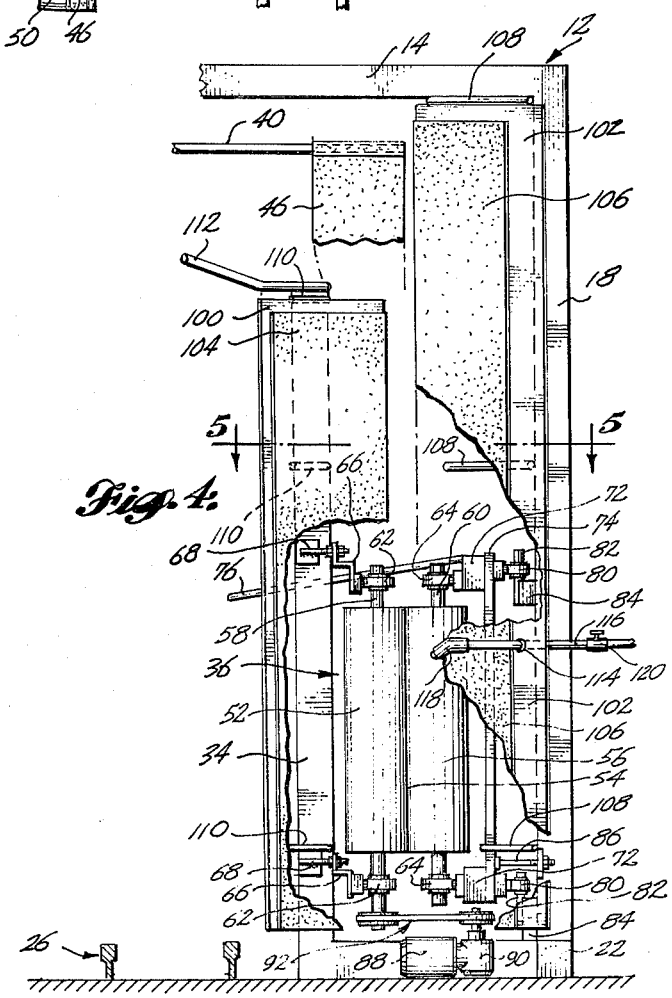
FIG. 4 is a partially cutaway side elevation view at enlarged scale of the wiper strips, rinse and wringer subassembly located at one side of the machine.
Figure 5:
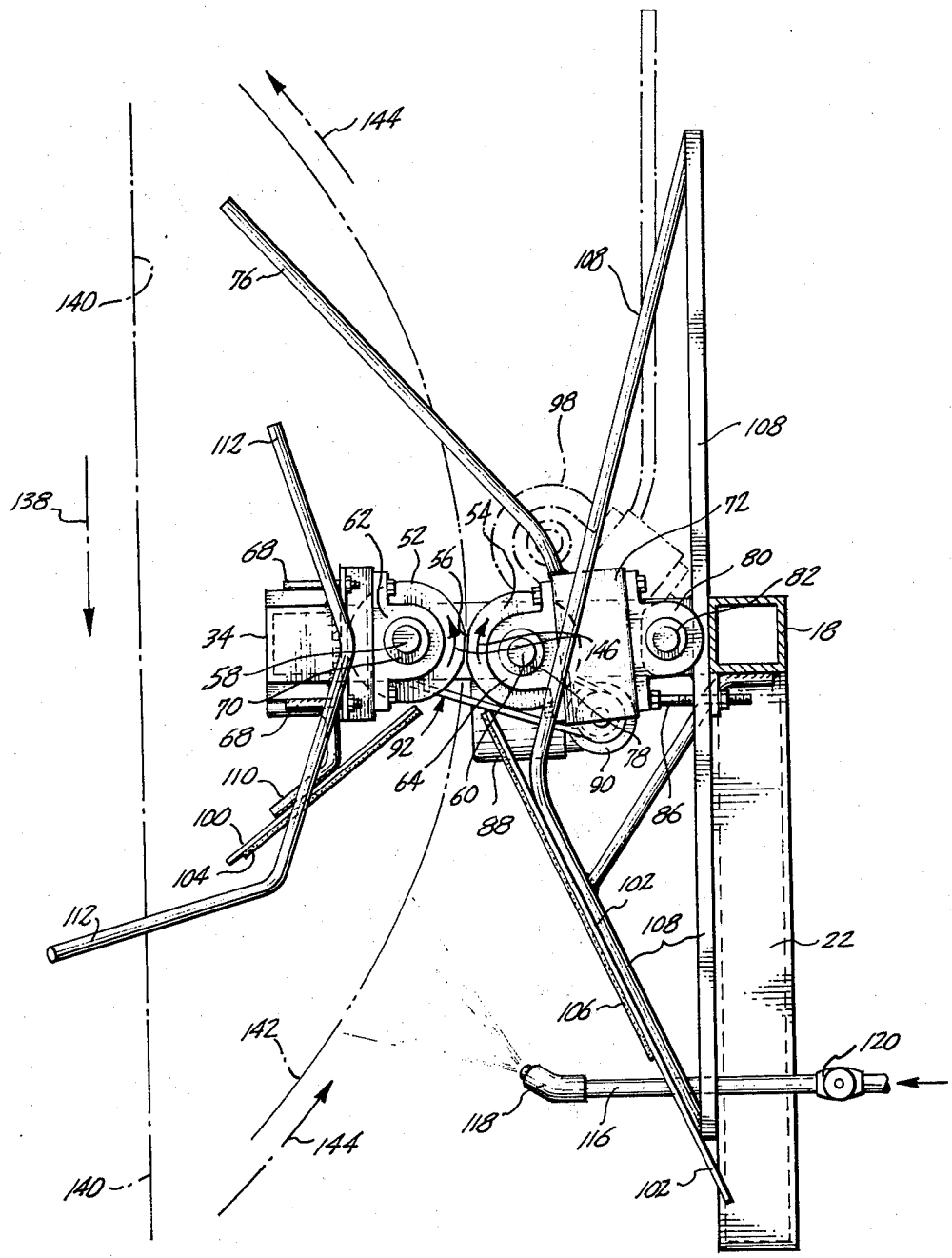
FIG. 5 is a plan view at a still larger scale of the wringer sub-assembly shown in FIg. 4 taken along section lines 5—5 in that figure.

The wringer subassembly 36 employed to dewater the chamois wiper strips 48 and 50 mechanically as the wiper spider rotates is shown in detail in FIGS. 4 and 5. The wringer comprises two right cylindrical rubber or resiliently compressible synthetic rollers 52 and 54, situated in rolling contact with one another to form a wringer nip 56. The roller axles 58 and 60 are journaled in pairs of pillow block bearings 62 and 64. The bearings 62 of the roller 52 adjacent the upright of the L-shaped beam portion 34 of the frame 12 are bolted to flange pieces 66 which are in turn bolted to threaded studs 68 welded or otherwise attached on each side of the beam 34. A double nut arrangement on each stud permits adjustment of the spacing of the flange pieces mounting the bearings relative to the beam. By this means contact pressure between rollers may be adjusted. A retaining ring 70 is attached to the upper end of the roller axle 58 to fix the longitudinal position of the roller within its bearings.

The opposite roller 54, is mounted similarly to the first roller, the ends of its axle 60 turning in pillow block bearings 64. The bearings however, are bolted to support blocks 72, which are in turn bolted to a plate 74, which effectively provides a common mounting for the bearings holding the roller and maintains the proper positional relationship between them. A section of tubing 76, protrudes from one side of the upper support block 72, and performs the dual function of guide and operating handle as hereinafter described. A retainer ring 78 attached to the upper axle extremity fixes the longitudinal position of the roller within its bearings. A second pair of pillow block bearings 80, are bolted to the back of the plate 74 mechanism which supports the roller 54, in its rotational bearings. The second set of bearings 80, are journaled on spindles 82, welded or otherwise attached to mounting blocks 84, in turn welded to the frame end post 18. By this means roller 54 and its entire support mechanism is pivotable about the spindles 82.

The rollers are positioned parallel to one another in a relationship which presses them together, such that a chamois wiping strip passes between, water is squeezed or wrung from the strip in a wringer action by mutual pressure of the rollers at the nip. As shown in FIG. 5, swinging of the assembly comprising roller 54 about spindles 82 into engagement with roller 52 is limited by an adjustable stop bolt 86. The latter is adjusted to limit the swing to an over-center relationship, that is, at a point where the plane containing the axes of spindles 82 and of roller 54 pass through and beyond the axis of roller 56. The roller 54 thus is held in the over-center relationsip by the resilient suction force of the compressed rollers.

Roller 52 is driven by adjustable-speed motor 88, via gear box 90 and belt and pulley drive 92. Roller 54 in turn is driven by roller 52 through frictional contact therewith. The direction of roller rotation is such that a chamois wiping strip entering the roller nip is drawn between the rollers in the direction of advancement of the strip on the rotating spider. For safety reasons, while the wiping strips speedily pass between wringer rollers 52 and 54, large objects such as the arm or limb of an operator will cause the pivoted roller 54 to swing yieldably out of its over-center operating position about spindles 82, into the released position generally indicated by dot-dash lines 98.

Reliable guidance of the advancing chamois wiping strips 48 and 50 into the nip of the wringer rollers 52 and 54 on each excursion of the strips is facilitated by mutually converging panels 100 and 102 positioned ahead of the rollers to form a wide entrance throat that narrows toward the rollers. Polypropylene carpeting material 104 and 106 of a porous or textured nature forces these guide panels. Since moist chamois tends to adhere and cling to smooth surfaces by a suction effect, uncovered guide panels would tend to hold back the chamois rather than guide them smoothly into the roller strip. Thus the nubby or porously textured carpeting facilitates the guiding effect of the convergent panels.

The outboard deflection panel assembly adjacent the frame end post 18 is bolted or otherwise attached to spaced tubular frames 108 which are in turn attached to the end post thereby fixing and rigidly holding the panel in position. The inboard panel, that nearest the vehicle, is likewise attached to and held in place by spaced fixtures 110, which are bolted to the L-shaped beam portion 34, of the frame 12. A guide 112, attached to the top of the L-shaped beam portion 34 of the frame effectively extends the width of the entrance throat between guide panels 100 and 102, particularly its reach or span toward the rotation axis of spider 32.

A hole 114, in the outboard panel 102, provides an opening through which a water spray pipe 116 extends into the region between guide plates 100 and 102. The pipe has a control valve 120 and a spray nozzle 118 on the end of the pipe directed to rinse chamois strips as or before they enter wringer nip 56. Control of valve 120 may be manual or, if desired, automatic.

Apart from merely serving to rinse the chamois strips free of mud and soilage, water from the spray nozzle 118 also performs the important function of assuming a minimum level of moisture in the chamois wiping strips passing through the wringer. This compensates for variations in the relative humidity of the ambient air, start up (dry) conditions, installation of fresh (dry) strips while others may already be wet, etc. A certain wetness of the chamois is necessary to its dry-wiping a smooth polished surface.

Figure 6:
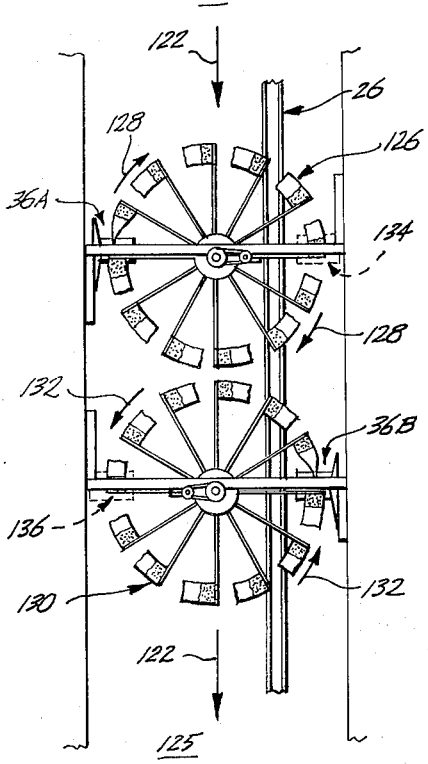
FIG. 6 is a plan view of the output end of an automobile machine wash facility incorporating two oppositely rotated dry wiping mechanisms of the present invention according to the preferred practice thereof.

In the preferred embodiment a car wash system incorporating the present invention, as heretofore described, at least two combined rotary spider assemblies and associated dewatering wringers are desirable, that system depicted in FIG. 6 having two such combinations. As shown by arrows 128 and 132 the successive spiders preferably rotate in opposite directions. In the initial or first such combination assembly 126 encountered by the conveyed vehicle moving in the direction of arrow 122 the spider rotates in a clockwise direction (viewed in plan).

In operation of a system, each chamois wiping strip sweeps across the vehicle twice in a single revolution. As the wiper strips then fall off the vehicle at the end of each sweep or pass they may be dewatered by a single wringer subassembly 36A or alternatively, twice during each revolution of the spider. In practice a single wringer subassembly is normally sufficient, however. The wiper strips in the 10 to 11 o'clock arc of revolution initially confront and wipe the side of the vehicle facing toward the wringer before passing over and wiping the upper surfaces of the vehicle. Those strips in the 4 to 5 o'clock arc of revolution confront and wipe the side away from the wringer before passing over and wiping the upper surfaces. Thus, in addition to the top surfaces, both sides of the vehicle are wiped and dried by the rotary drier assembly as the vehicle passes beneath.

As the vehicle emerges from the reach of the first rotary drier stage 126, it enters that of the second drier stage 130. Note that the wringer 36B in the second drying wiping stage 130, is situated on the side of the conveyor 26 opposite that occupied by the wringer in the first stage, since the spider in the second stage rotates in a counterclockwise direction as indicated by arrows 132. It can be seen that the wiper strips in the 2 to 1 o'clock arc of rotor revolution in the secondary stage confront and wipe the side of the vehicle toward the wringer before passing over and wiping the upper vehicular surfaces. Similarly, those strips at the 8 to 7 o'clock arc of rotor revolution confront and wipe the side away from the wringer before passing over and wiping the upper surfaces. Thus, the two stage drier system of this invention provides a symmetry of drying action applied to the advancing vehicle not achieved by a single stage system.

FIG. 6 illustrates each rotary dry wiping stage adequately equipped with a single wringer subassembly; however, it is obvious that the wiper chamois of the first wiper stage 126 will become more heavily laden with the water from the wet surfaces of the car than those in the second stage acting on the partially dried surfaces. Therefore, the first stage in some cases may advantageously employ two wringer subassemblies stationed at respectively opposite sides of conveyor 26. Additionally, a double wringer and rinse nozzle arrangement in the initial drying stage provides the advantage of greater chamois strip washing capability; a particularly advantageous feature in muddy wet weather or in dusty areas.

The successive stages or processes in the car wash facility are activated and deactivated electro-mechanically by the vehicle itself as it moves along the conveyor and, if desired, with suitable timing and control means controlling conveyor speed in a suitable manner. In the rotary dry wiping device of the present invention, the speed of spider rotation is chosen to provide optimum drying effectiveness, and the vehicle conveyor speed is set in relationship therewith. With the vehicle moving at a relatively slow rate, the speed of spider rotation may also be kept low enough to prevent undesired centrifugal outward swinging of the drying strips.

The wringer roller drive motor is adjusted to a speed at which wiping strips passing through the wringer nip advance through the rollers at or slightly faster than the speed of travel of the chamois strips being carried by the rotary spider. Approximate speed corresponding in that regard is desirable to avoid having the rollers pull the chamois strips from their supports, through separation at the Velcro attachments. If the wringer passes the wiping strips too fast, causing a bunching of the strips on the wringer output side, natural adhesion of the moist chamois to the smooth surfaces of the rollers may cause the strips to wind about the rollers. Thus it can be seen that ideally the rollers are driven in rotation at a speed that will allow the rotor arms to lead the chamois wiper strips through and away from the wringer rollers.

In FIG. 5, arrow 138 illustrates the direction of vehicle movement beneath the rotary dry wiping device while a dot-dash line 140, indicates the typical position of the side of the vehicle as governed by the conveyor which moves the vehicle. Dot-dash line 142 indicates the arc of rotation of the ends of the rotor arms relative to the wringer, and arrows 144 indicate direction of rotor rotation. Arrows 146 additionally indicate direction of rotation of the wringer rollers. As they fall free of the vehicle, chamois wiper strips trailing from the rotor arms across the upper vehicular surfaces are guided to the wringer nip 56, first by the guide rail 112 then by panels 100 and 102. Rail 112 is welded to the upper end of the L-shaped beam portion 34. As the wiper strips emerge from the wringer rollers and trail they are drawn against and across the side 140 of the vehicle, but at a rate which is increased by guide rail 76 angled more obliquely to the vehicle side 140 than the natural arc of travel of the strips. The rail 76 provides improved wiping contact against the car side surfaces.

While the preferred embodiment of this invention has been illustrated and described herein, various applications, modifications, changes and equivalent forms will be apparent to those skilled in the art and are intended to be covered by the claims which follow.

What is claimed is:

1. Automobile drying apparatus for use in a mechanized wash establishment through which automobiles are moved along a defined path, said apparatus comprising an overhead rotor assembly, means to advance an automobile progressively along said path to beneath and beyond said rotor assembly, means mounting said rotor assembly to move circuitously approximately in a horizontal plane elevated above said path, said rotor assembly having suspended therefrom a plurality of strips of flexible water-absorbtive material spaced from each other along their circuit of movement, the movement of at least some of said strips ranging laterally beyond at least one side of the automobile path, and strip dewatering means comprising cooperating wringer rollers, means mounting said wringer rolls in generally upright parallel positions stationed adjacent said one side of said path, and strip guide means so positioned and formed as to lead the suspended strips into said wringer rolls which have been drawn across the automobile toward said side, and power means operable respectively to drive said rotor assembly and said wringer rolls.

2. The automobile drying apparatus defined in claim 1 wherein the strips comprise chamois-like sheet material.

3. The automobile drying apparatus defined in claim 2 wherein the strips further comprise relatively heavy supporting strips of flexible sheet material connected directly to the rotor assembly and to the lower ends of which latter sheet material strips the chamois-like strips are detachably connected permitting the chamois-like strips to detach automatically when snagged on automobile parts.

4. The automobile drying apparatus defined in claim 3 wherein the detachable connection between the sheet material strips comprises "Velcro" elements.

5. The automobile drying apparatus defined in claim 2 including pressurized water spray nozzle means disposed adjacent the wringer rolls to wet the chamois-like strips immediately before they enter the nip between the wringer rollers.

6. The automobile drying apparatus defined in claim 2 wherein alternate strips suspended from the rotor assembly are shorter in length.

7. The automobile drying apparatus defined in claim 1 wherein rotor assembly is formed and mounted to rotate on a vertical axis, and the power means cause rotation of the wringer rolls at a surface speed approximating the linear speed of rotation of the strips supported by the rotor assembly.

8. The automobile drying apparatus defined in claim 7 wherein the guide means comprises at least one upright panel positioned adjacent the nip between the wringer rollers and angled toward the rotor axis in a horizontal plane relative to the line of advancement of strips incident on said panel so as to deflect the strips into the roller nip.

9. The automobile drying apparatus defined in claim 8 wherein the guide means panel is surfaced with roughly textured material and the strips comprise chamois-like material.

10. The automobile drying apparatus defined in claim 9 wherein the guide means further comprises an elongated deflector bar element mounted above the panel and extending inwardly therefrom generally into the region beneath the rotor assembly at an elevation level generally above the automobile path, thus to catch and direct strips into the nip between wringer rollers which otherwise tend to stick to the automobile.

11. The automobile drying apparatus defined in claim 1 wherein one of the wringer rollers is mounted on an arm that permits swinging of such roller about a vertical axis into and from cooperating engagement with the other wringer roller along a path of incidence thereon which is substantially tangential to said latter roller, and means limiting the path of swing to a position slightly beyond over-centering relationship of the interengaged wringer rollers, said rollers comprising material of such resilient compressibility as to retain the rollers in over-centered cooperating engagement while passing the strips there-between while larger objects attempting to pass between the rollers cause reverse swinging of the arm-mounted roller out of cooperating engagement with the other roller.

* * * * *